United States Patent Office 2,970,972
Patented Feb. 7, 1961

2,970,972

RESINOUS COMPOSITIONS

Robert L. Wear, West St. Paul, and Benji Oiye and Arthur S. Winthrop, St. Paul, Minn., assignors to Minnesota Mining and Manufacturing Company, St. Paul, Minn., a corporation of Delaware No Drawing. Filed Dec. 31, 1956, Ser. No. 631,420

5 Claims. (Cl. 260—18)

This invention relates to epoxy resin compositions and structures. More particularly, this invention relates to tacky, semi-solid epoxy resin compositions which may be rapidly cured by the simple addition of a curing agent and heating to form extremely tough but flexible, water-resistant materials of good electrical properties.

The tacky semi-solid epoxy resin compositions hereof may vary in texture from viscous liquid to highly pasty, easily workable masses. The compositions are not flaccid or cheesy but instead are cohesive in nature. They may be somewhat pourable at room temperature although they would not ordinarily be characterized as such. The term "semi-solid" is used to designate the intermediate physical state of these compositions inasmuch as they lie between readily pourable viscous liquids and materials which are true solids.

The compositions hereof have a useful pot life at room temperature on the order of up to two weeks or longer, but become gelled on lengthy standing, usually to a point rendering them insoluble or difficultly soluble in organic solvents such as, for example, methyl ethyl ketone and toluene. While gelation tends to render the compositions insoluble in organic solvents, it improves the cohesiveness of the compositions, and their tacky semi-solid character is retained even after such gelation as occurs on standing. After such gelation, they may be further cured, as hereinafter described.

When our compositions are held at room temperatures, they remain semi-solid and tacky for periods on the order of one month up to about six months or longer. They remain semi-solid and tacky for lengthy periods even when curing agents, as illustrated herein, are admixed therewith. After storage with admixed curing agent, preferably at a storage temperature below about 5° C. if stored in bulk form, but suitably at room temperature when stored as a coating on a film, the compositions may be rapidly cured, usually in less than two hours, by heating to elevated temperatures, e.g., on the order of 150° C. to 180° C. Without admixed curing agent our compositions may be held at elevated temperatures for several hours, e.g., at least four or five hours and frequently as long as 15 hours or longer, without becoming cured and thereby losing their tacky semi-solid state.

The adhesive or tacky nature of our semi-solid compositions is a particularly advantageous property. Our compositions may be applied to a wide variety of surfaces and adhere well. They are cohesive, a property aided in part by gelation, and therefore tend to remain in place once applied.

One of the more interesting properties of our compositions is their high adhesion to films such as those of polyethylene terephthalate ("Mylar"). Insofar as we are aware, all known thermosetting epoxy adhesives stick only poorly to polyethylene terephthalate fibers and films. It was particularly surprising, therefore, that the adhesive-like epoxy compositions hereof readily anchor themselves to such films and fibers. It has long been known that polyethylene terephthalate possesses excellent electrical characteristics for use as an insulator, but the use of this material in combination with epoxy resins in electrical applications has been somewhat restricted by the lack of suitable thermosetting epoxy adhesives which adhere thereto. The composition of this invention, therefore, provides for improved usage of polyethylene terephthalate materials.

Resinous compositions of this invention admixed with curing agent have been applied between polyethylene terephthalate films and cured under heat and pressure to produce laminates which are inseparable without damage to the polyethylene terephthalate films.

In addition to the foregoing, our compositions possess other advantageous properties long sought after in epoxy resin materials. Our compositions are easily and readily cured or thermoset, by the simple addition of curing agent and heating, into extremely tough but flexible insoluble and infusible masses which exhibit very good electrical properties. The cured mass is not substantially affected by prolonged exposure to water and is particularly effective as electrical insulation around splices and the like. Insulation is unified and yet flexible so that it remains as an integral encasement around a splice or the like and does not crack under mechanical stress. Cracking of certain types of epoxy insulation causes unwanted electrical losses and has been a rather serious problem in the past.

While somewhat flexible epoxy insulation is known in the prior art, none is known to us which, while possessing the foregoing properties, particularly that property of remaining substantially unaffected even after prolonged exposure to water, also retains such properties as flexibility and toughness when subjected for extended periods to high temperatures, e.g., on the order of 150° C. We have formed very tough and flexible epoxy insulation which has remained flexible and tough after being held at 150° C. for over one week.

We have discovered that a highly useful class of complex oxirane oxygen containing resinous compounds, of properties as aforedescribed, can be formed by heat condensing mixtures of partially amidized polybasic acids, as hereinafter defined, with an excess, on a reaction equivalent basis, of an epoxy resin. In this specification, the term "partially amidized polybasic acid" means the condensation product of an excess, on a reaction equivalent basis, of a polybasic acid, preferably a dimerized fatty acid, and a secondary amine such as a di-secondary amine or a secondary amine containing a reactive hydroxyl group, or mixtures of such secondary amines. As examples of suitable di-secondary amines to use, piperazine, N,N'-dimethyl ethylene diamine, N,N'-dimethyl hexamethylene diamine, etc., may be mentioned. Illustrative secondary amines containing reactive hydroxyl groups are N-butyl ethanolamine, N-methyl ethanolamine, N-methyl aminohexanol-1,6, and N-cyclohexyl ethanolamine, etc. It is of critical importance to employ secondary amines of the general type illustrated, as distinguished from primary amines or the like, in making the partially amidized polybasic acids of this invention.

The polybasic acids which are particularly useful in the practice of this invention are dibasic acids with chains of at least about 14 carbon atoms separating the carboxyl groups. Polybasic acids containing more than 2 carboxylic acid groups are also valuable where there are at least about 14 carbon atoms between the closest carboxylic acid groups. While less preferred, useful products can be formed using polybasic acids which contain as few as 4 carbon atoms between the carboxylic functions, as in the case of adipic acid. Compositions formed with partially amidized adipic acid, however, have inferior flexibility when fully cured, as compared to the flexibility of the fully cured preferred compositions hereof. Of particular value are the polybasic acids obtained by the polymerization of semi-drying or drying oil fatty acids, or by the saponification of the esters of such polymerized acids and acid regeneration of the carboxylic groups. These polymerized polybasic acids are extremely complex and may contain 30 or 40 or more carbon atoms in their structure. Their free carboxyl groups, however, are usually separated by considerably fewer carbon atoms; and side groups, rings or nuclei account for many of the carbon atoms in their structure. Illustrative oils which furnish fatty acids suitable for polymerization are tung, linseed, soyabean, cottonseed, safflower, dehydrated castor oil, etc. The polymerized acids derived from linseed oil in particular are readily available by polymerization according to what is known as the Diels-Alder reaction. After the reaction, unpolymerized or unpolymerizable low molecular weight components may be removed from the dimerized acid. Similarly, extremely complex dimerized fatty acids can be formed from soyabean oil, or other drying oil fatty acids. These dimerized fatty acids may contain some unsaturation, or they may be completely saturated. A certain amount of monomeric and trimeric acids may comprise part of the resulting mixture, and this has not been found to be detrimental to the formation of the compositions hereof.

In condensing the secondary amine and an excess, on a reaction equivalent basis, of polybasic acid, as illustrated in the examples to follow, a carboxylic acid group from one polybasic acid molecule likely reacts with the secondary amine and becomes amidized. Further, it is very probable that a carboxylic acid group from a different polybasic molecule reacts with the reactive hydroxyl of the secondary amine employed, or the remaining free secondary amine group of a di-secondary amine, if such is employed, to become esterified or amidized. The result is that a rather large bulky molecule having free carboxylic acid end groups is formed.

In calculating reaction equivalents of polybasic acid in a mixture to be reacted, carboxylic acid groups of the polybasic acid are used; for the secondary amine, the secondary amine groups and hydroxyl groups, if hydroxyl groups are present, are used. Equivalents of the resulting partially amidized polybasic acid mixed with epoxy resin are calculated by referring back to the reaction equivalents of materials from which the partially amidized polybasic acid was formed. In essence, they are calculated on the basis of carboxylic acid end groups which remain unreacted (i.e., not amidified or esterified) after partial amidification as herein discussed.

After preparing the partially amidized polybasic acid, we then mix it with an excess, on an equivalent basis, of an epoxy resin and heat the mixture to form the tacky, coherent semi-solid mass of this invention. Generally we mix about 2 equivalents of the partially amidized polybasic acid with more than 2 and up to about 6 equivalents of epoxy resin. Calculation of the reaction equivalents of epoxy resin is set forth below.

Typical useful epoxy resins having a 1, 2 epoxy group are those which are produced by the reaction of 2,2-bis (4-hydroxyphenyl) propane (i.e., Bisphenol A) and a molar excess of epichlorhydrin in the presence of a base such as sodium hydroxide at elevated temperatures within the approximate range of 50–150° C. The resulting resinous polyether is a complex mixture rather than a single chemical compound, but may be represented by the formula where $n$ has an average value between zero and about seven, depending for the most part on the relative proportions of Bisphenol A and epichlorhydrin in the initial reaction mixture. Other polyhydric phenols, e.g. resorcinol, 2,2-bis-(4-hydroxyphenyl)-butane, and various tris-phenols, may be substituted for the Bisphenol A. Various other polyhydroxy compounds may likewise be substituted, by appropriate known procedures, for the polyhydric phenols in preparing analogous resinous base materials useful for the general purposes of this invention, ethylene glycol and glycerine being typical examples. The epichlorhydrin component likewise may be replaced by other compounds serving as equivalent reactive sources of epoxy radicals. In all cases, more than one epoxy radical is present per mol, on the average. To distinguish these epoxy materials from epichlorhydrin and the like, it has sometimes been stated that they have an "epoxy equivalency" greater than one per average molecular weight or per mol. The term "epoxy resin" alone, however, has been used extensively in the literature in the manner used herein, and is considered adequate to characterize the materials. In calculating reaction equivalents of epoxy resin to use in forming our compositions, the epoxy groups of the resin are used.

Epoxy resins of the foregoing general types are commercially available under such trade designations as, for example, "ERL 2774" from the Bakelite Division of Union Carbide & Carbon Co., and "Epon 828" and "Epon 864" from Shell Development Company. Characteristically these resins by themselves are permanently liquid or thermoplastic, but the addition of certain amines plus heating has long been known as an effective way to cure them into rigid solid infusible products. Heretofore no one to our knowledge has successfully added an amidized polybasic acid to these materials without producing a composition that heat cures rather rapidly to an infusible state, and usually to a rather hard or brittle state.

As aforepointed out, our compositions containing partially amidized polybasic acid, but not containing an added curing agent, may be elevated in temperature and yet do not rapidly cure to solid infusible masses. However, they may be cured in a rapid manner into a tough flexible state by admixing therewith well-known curing agents for epoxy resins, and heating the mixture. Some illustrative suitable curing agents to employ are dihydrazides of polybasic acids (e.g., adipyl and isophthalyl dihydrazides), dicarboxylic anhydrides (e.g., phthalic anhydride and tetrapropenyl succinic anhydride), aromatic diamines (e.g., m-phenylene diamine), 2,4-dihydrazino - 6 - methylamino-s-triazine, etc. While some curing of our composition may be effected without the aid of curing agent by heating the composition for an extended period of time, this is impractical since an untoward lengthy period of time is required.

The following non-limitative but specific examples are offered to further illustrate our invention.

*Example 1*

In a 500 cc. 3-necked round bottom flask fitted with a thermometer, mechanical stirrer, a condenser and Barrett trap, were placed 120 gm. (0.4 equivalent) of a dimerized fatty acid mixture (available commercially under the name "Empol 1022 Polymerized Fatty Acid" from Emery Industries, Inc.), 19.4 gm. (0.2 equivalent) of piperazine hexahydrate and 65 ml. of toluene. "Empol 1022 Polymerized Fatty Acid" is believed to consist of the product resulting from the dimerization of soyabean fatty acid. The mixture was heated so that water was distilled off with the toluene and collected in the trap for 6½ hours.

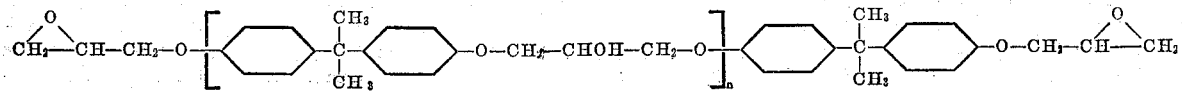

The temperature of the mixture increased from about 105 to 135° C. during this time and a total of about 14.5 ml. of water was collected.

The toluene remaining in the flask was distilled off at reduced pressure to leave a residue of the partially amidized dibasic acid having about 0.2 equivalent of carboxylic acid groups. This condensation product was rather viscous when cooled, but readily flowable at 100° C.

This residue was then reacted with 76 gm. (0.4 equivalent) of liquid epoxy resin "ERL 2774," which is apparently the reaction product of Bisphenol A and an excess of epichlorhydrin, and contains about 8–8½% oxirane oxygen. The mixture was stirred and heated for 3 hours at about 120° C. to give a soft, extremely tacky, semi-solid resinous material containing 1.28% oxirane oxygen. This material was extremely viscous and only slowly flowable at room temperature. Even after heating for a few hours at 150° C., it remained in a tacky semi-solid condition.

Curing of 1025 parts by weight of this material intimately mixed with 43 parts by weight of adipyl dihydrazide curing agent was accomplished by heating the mixture for 30 minutes at 150° C. A flexible, very tough, water-resistant and heat-resistant material of very good electrical properties resulted. Even after 24 hours' immersion in boiling water the material showed no deterioration of its properties and no significant absorption of water.

*Example 2*

The partially amidized fatty acid here was prepared from 240 gm. (0.8 equivalent) of the dimerized fatty acid of Example 1 and 24 gm. (0.4 equivalent) of N-butylethanolamine by the procedure described above in Example 1. Water was collected as before and totaled about 8 ml. after 3½ hours. After removal of the toluene as described in Example 1, 156 gm. (0.8 equivalent) of the liquid epoxy resin of Example 1 was added and the mixture heated at 125–130° C. for 3 hours. The resulting resinous material was a soft, tacky, extremely viscous but pourable semi-solid. It was relatively stable at room temperature and could be heated for several hours without loss of its semi-solid condition.

This material was cured by heating as described in Example 1, using 43 parts adipyl dihydrazide curing agent with 1200 parts of the resin, to give a flexible, very tough material having very good electrical properties and water resistance.

A further sample of this material was cured by heating under the same conditions using 48 parts by weight of isophthalyl dihydrazide as the curing agent with 1200 parts resinous material. A very tough, flexible material resulted. On nine days' heating at 150° C. this material lost 2.3% of its weight, and darkened in color, but retained its flexibility and toughness at room temperature.

In 73.9 parts of the tacky semi-solid material of this example, heated briefly to about 150° C., were stirred 3.1 parts of isophthalyl dihydrazide, 3 parts of "Bentone 34," and 20 parts of 1000 mesh mica as a filler. "Bentone 34" is an ammonium cation-modified base-exchange clay believed to comprise dimethyldioctadecyl ammonium bentonite. The mixture was cooled to room temperature and the additives all further dispersed by milling on a rubber mill until a uniform blend resulted. After milling, the dispersion was made more manageable by dilution with 20 parts of methyl ethyl ketone so that it was easily pourable. It was then spread on a web consisting of 3 plies, each about 3 mils thick of polyethylene terephthalate fibers. The resinous mixture adhered to the web of fibers very well. The construction was dried and then cured for one-half hour at 150° C. The cured construction was flexible and the cured composition adhered very firmly to the fibers of polyethylene terephthalate.

*Example 3*

Another partially amidized fatty acid was prepared using 600 gm. (2 equivalents) of the dimerized fatty acid of Example 1, 37.5 gm. (1 equivalent) of N-methyl ethanolamine and 250 ml. of toluene. After heating as described in Example 1, and collecting about 16 gm. of water, the toluene was distilled off, and the residue (containing 1 equivalent of non-reacted carboxylic acid groups) reacted with 390 gm. (2 equivalents) of the epoxy resin of Example 1 in a vessel fitted so that a Brookfield viscometer was immersed to follow the change of viscosity as reaction progressed. During the reaction at about 120° C. the viscosity increased gradually from 2 to 10 poises in about 3 hours. After remaining at that value for about one hour additional heating, the mixture was cooled, the viscosity increasing with decreasing temperature to about 130 poises at 72° C. The resulting tacky resinous semi-solid material contained 1.5% oxirane oxygen.

48 parts of isophthalyl dihydrazide were milled into 1400 parts of the above material on a rubber mill until a uniform blend resulted. The mixture was sheeted out and cured in sheet form into a tough flexible product by heating for one hour at about 160° C. When tested for elongation on an Instron tensile strength tester, the cured sheet material stretched to more than 200% of its original length before breaking. Its tensile strength was in excess of 250 pounds per square inch.

With 97 parts of the semi-solid resinous material of this example dispersed in 33 parts of a solvent mixture of 80% methyl ethyl ketone and 20% toluene were blended 10 parts of a paint milled mixture of 50% isophthalyl dihydrazide and 50% liquid epoxy resin ("ERL 2774" of Example 1). This blend was coated on a one mil thick polyethylene terephthalate film ("Mylar") at a coating weight sufficient to leave about 9.5 grains of solids per 24 square inches after evaporation of solvent. The coated film, cut in tape form, was wrapped in overlapping convolutions around a brass pipe and heated to 150° C. for about 45 minutes to produce a tough, flexible, void-free, water-resistant seal of good electrical properties.

A mixture of 1400 parts of the above semi-solid material, 48 parts isophthalyl dihydrazide, 647 parts 1000 mesh mica and 65 parts "Bentone 34" was prepared by milling on a rubber mill, and the blend was dispersed in 540 parts by weight of methyl isobutyl ketone to give a fluid material very suitable for solvent coating.

A 6 inch wide length of polyethylene terephthalate film, with a layer of fibers of the same material about .003 inch in diameter thereon, was coated with this mixture to a coating weight of about 100 grains of the mixture per 24 square inches. The mixture adhered well to the polyethylene terephthalate film. Drying gave a residue of about 80 grains per 24 square inches of film. The tape was then hand-wrapped in overlapping convolutions about a splice. It adhered well to itself and remained in place. It was then heated to 150° C. for 30 minutes to effect curing. A tough, water-resistant, thermoset, flexible, unified seal of very good low-loss electrical insulation properties resulted. The tape showed an average breakdown voltage of about 4000–5000 volts per mil. Even without the high insulating value of the polyethylene terephthalate backing, the cured resin itself had a breakdown voltage of about 1000 volts per mil.

This tape was wrapped in convolutions in a roll, using a low-adhesion interliner (polyethylene treated paper) to separate the convolutions in the roll, and stored at room temperature for six months. At the end of this period the coating of epoxy resin composition was still found to be suitably tacky for adhesion of the tape in wrapping coils and the like. The composition could be used to form an integral seal by heating.

The partially amidized fatty acid of this example (containing about 2 equivalents of reactive carboxylic acid groups per mol) has also been mixed with an excess, on an equivalent basis, of various epoxy resins to form a variety of tacky semi-solid materials. It has been found that as large an excess as 6 equivalents of epoxy resin mixed with 2 equivalents of partially amidized fatty acid gives resinous semi-solid materials of desirable properties which are curable to form tough flexible products.

*Example 4*

In a manner similar to Example 3, 360 gm. of dimerized fatty acid of that example and 34.3 gm. of 2,5-dimethylpiperazine in 175 ml. of toluene were reacted and toluene removed. The product was then mixed and heated with 234 gm. of the epoxy resin of Example 3 in a flask fitted with a Brookfield viscometer. The viscosity increased from about 3 poises to 20 poises at 130° C. during 1½ hours of heating. The viscosity showed a drop when the temperature was initially raised, but it remained at about 15 poises at 136° C., heating being discontinued after about 3½ hours. The resulting product was a typical tacky semi-solid as aforedescribed, and could be cured, with the addition of a curing agent, to a tough flexible water-resistant material.

Various materials, e.g., fibers, fillers, coloring agents, etc., may be incorporated in the resinous materials of the instant invention, with or without the presence of added curing agent. Particles or flakes of mica or similar material can be bonded together in sheet form, or other shapes, using the composition of this invention. Our resinous compositions, with or without curing agent, may be used to impregnate or coat various articles, fabrics, porous structures and the like, and thereafter, in desired cases, may be heated to effect curing, or partial curing. In some cases heat curing of the composition is carried out only to a partial degree so as to preserve some of the tacky adhesive properties of our composition, but yet raise its internal strength properties.

That which is claimed is:

1. A tacky, semisolid, cohesive epoxy resinous composition having a useful pot life and capable of being held at an elevated temperature for several hours without loss of its tacky semi-solid state, said composition being further characterized by exhibiting high adhesion to polyethylene terephthalate polymer surfaces and by rapidly curing to a very tough flexible water-resistant mass when heated after admixing a curing agent therewith, and comprising the condensation product of approximately 2 reaction equivalents of a partially amidized polybasic acid and more than 2 and up to 6 reaction equivalents of a 1,2 epoxy resin, said partially amidized polybasic acid being formed by condensing approximately two reaction equivalents of polybasic fatty acid with approximately one reaction equivalent of a secondary amine selected from the group consisting of di-secondary amines, secondary amines having a free hydroxyl substituent, and mixtures thereof, said polybasic acid having an average of at least two carboxylic acid groups per molecule and having a chain of at least about 14 carbon atoms separating the closest carboxylic acid groups thereof.

2. A tacky, semi-solid, cohesive epoxy resinous composition having a useful pot life and capable of being held at an elevated temperature for several hours without loss of its tacky semi-solid state, said composition being further characterized by exhibiting high adhesion to polyethylene terephthalate polymer surfaces and by rapidly curing to a very tough flexible water-resistant mass when heated after admixing a curing agent therewith, and comprising the condensation product of approximately 2 reaction equivalents of a partially amidized dimeric fatty acid and more than 2 and up to 6 reaction equivalents of a 1,2 epoxy resin, said partially amidized dimeric fatty acid being formed by condensing approximately two reaction equivalents of dimeric fatty acid with approximately one reaction equivalent of a secondary amine selected from the group consisting of disecondary amines, secondary amines having a free hydroxyl substituent, and mixtures thereof, said dimeric fatty acid having a chain of at least about 14 carbon atoms separating the closest carboxylic acid groups thereof.

3. A structure comprising a substrate material having a surface and, upon said surface, an adherent tacky coating of an epoxy composition and a curing agent for said composition admixed therewith, said coating being characterized by exhibiting high adhesion to polyethylene terephthalate polymer surfaces and by rapidly curing to a very tough flexible water-resistant state on heating to elevated temperatures, the epoxy composition of said coating comprising the condensation product of approximately 2 reaction equivalents of a partially amidized polybasic acid and more than 2 and up to 6 reaction equivalents of a 1,2 epoxy resin, said partially amidized polybasic acid being formed by condensing approximately two reaction equivalents of polybasic fatty acid with approximately one reaction equivalent of a secondary amine selected from the group consisting of di-secondary amines, secondary amines having a free hydroxyl substituent, and mixtures thereof, said polybasic acid having an average of at least two carboxylic acid groups per molecule and having a chain of at least about 14 carbon atoms separating the closest carboxylic acid groups thereof.

4. A flexible tape adapted to be wound in overlapping convolutions and heated to form a void free integral seal, said tape comprising a flexible backing member and an adherent tacky semi-solid coating upon at least one surface of said backing member; said coating being characterized by exhibiting high adhesion to polyethylene terephthalate polymer surfaces and by rapidly curing to a very tough flexible water-resistant state on heating to elevated temperatures and comprising an epoxy composition and a curing agent for said composition admixed therewith, said epoxy composition comprising the condensation product of approximately 2 reaction equivalents of a partially amidized polybasic acid and more than 2 and up to 6 reaction equivalents of a 1,2 epoxy resin, said partially amidized polybasic acid being formed by condensing approximately two reaction equivalents of polybasic fatty acid with approximately one reaction equivalent of a secondary amine selected from the group consisting of di-secondary amines, secondary amines having a free hydroxyl substituent, and mixtures thereof, said polybasic acid having an average of at least two carboxylic acid groups per molecule and having a chain of at least about 14 carbon atoms separating the closest carboxylic acid groups thereof.

5. The flexible tape of claim 4 wherein the flexible backing member comprises a film of polyethylene terephthalate polymer.

References Cited in the file of this patent

UNITED STATES PATENTS

| 2,379,413 | Bradley | July 3, 1945 |
|---|---|---|
| 2,450,940 | Cowan et al. | Oct. 12, 1948 |
| 2,599,974 | Carpenter et al. | June 10, 1952 |
| 2,625,536 | Kirby | Jan. 13, 1953 |
| 2,681,901 | Wiles | June 22, 1954 |
| 2,682,515 | Naps | June 29, 1954 |
| 2,705,223 | Renfrew et al. | Mar. 29, 1955 |
| 2,707,708 | Wittcoff | May 3, 1955 |
| 2,723,241 | DeGroote et al. | Nov. 8, 1955 |

FOREIGN PATENTS

| 516,106 | Canada | Aug. 30, 1955 |

OTHER REFERENCES

Swann: By Gum!, pages 14–20, September–October 1956.